March 29, 1927.
H. T. THOMAS
1,622,475
TRANSMISSION BRAKE
Filed Aug. 6, 1921
6 Sheets-Sheet 1
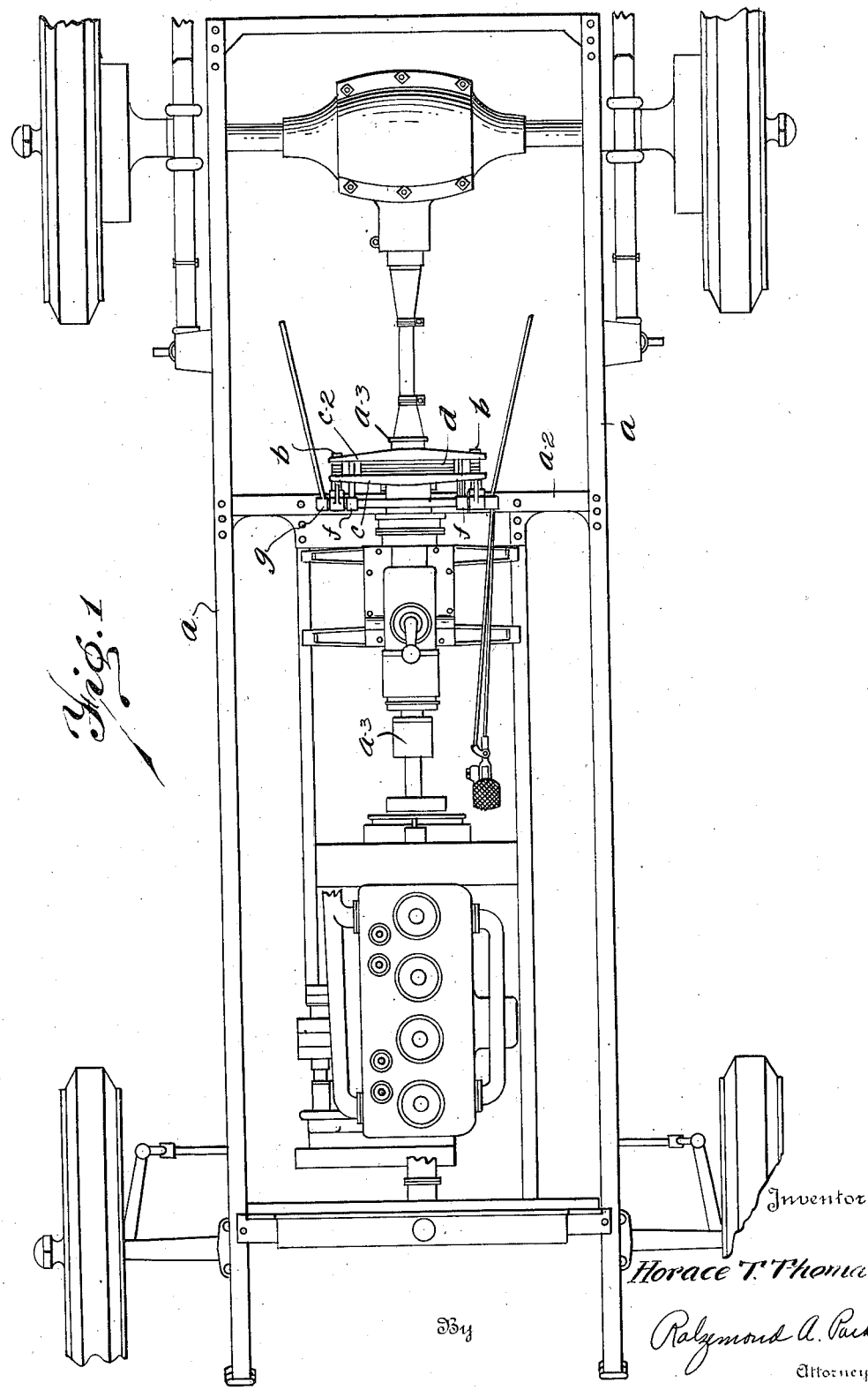
Inventor
Horace T. Thomas
By Raymond A. Parker
Attorney

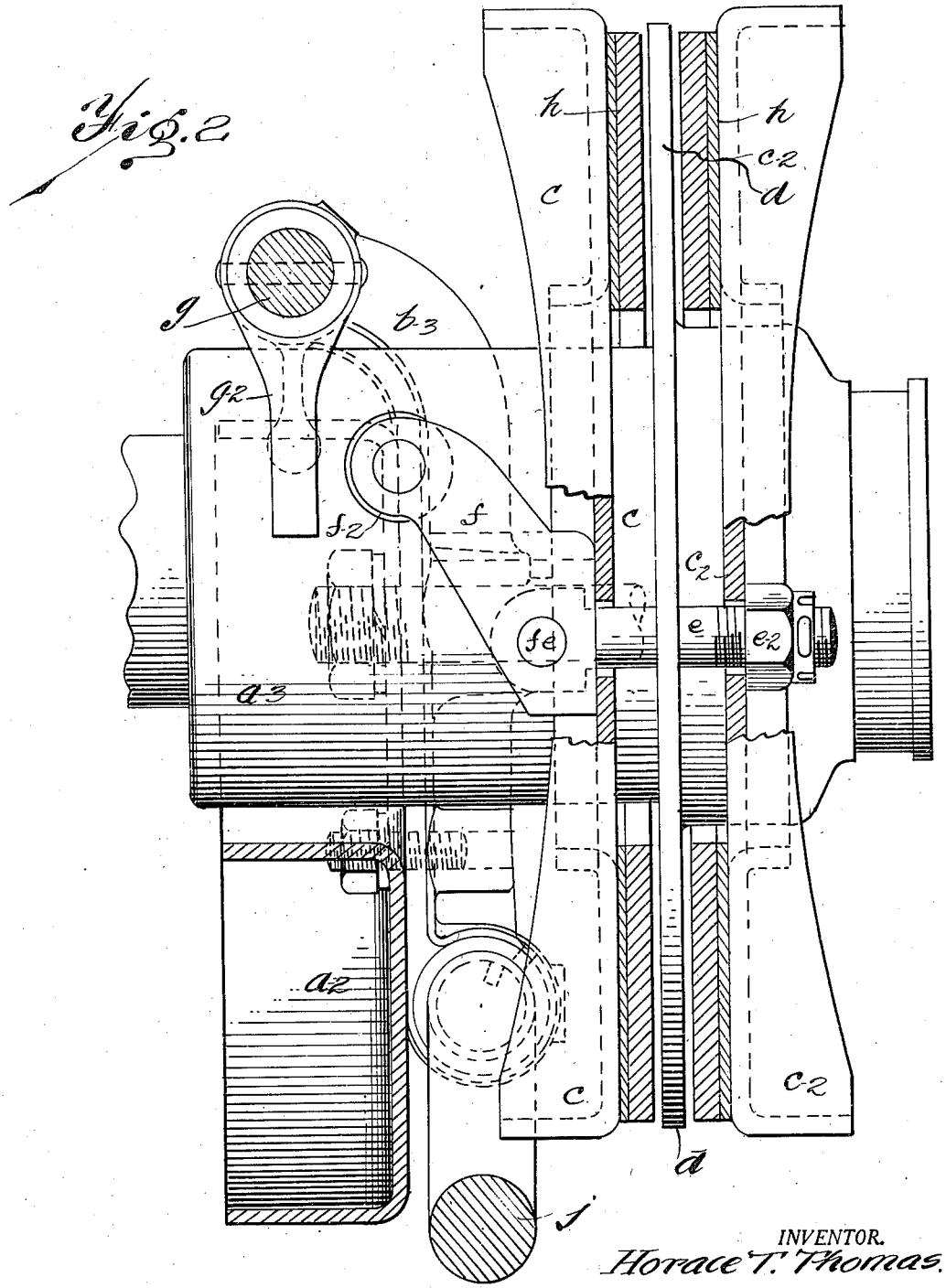

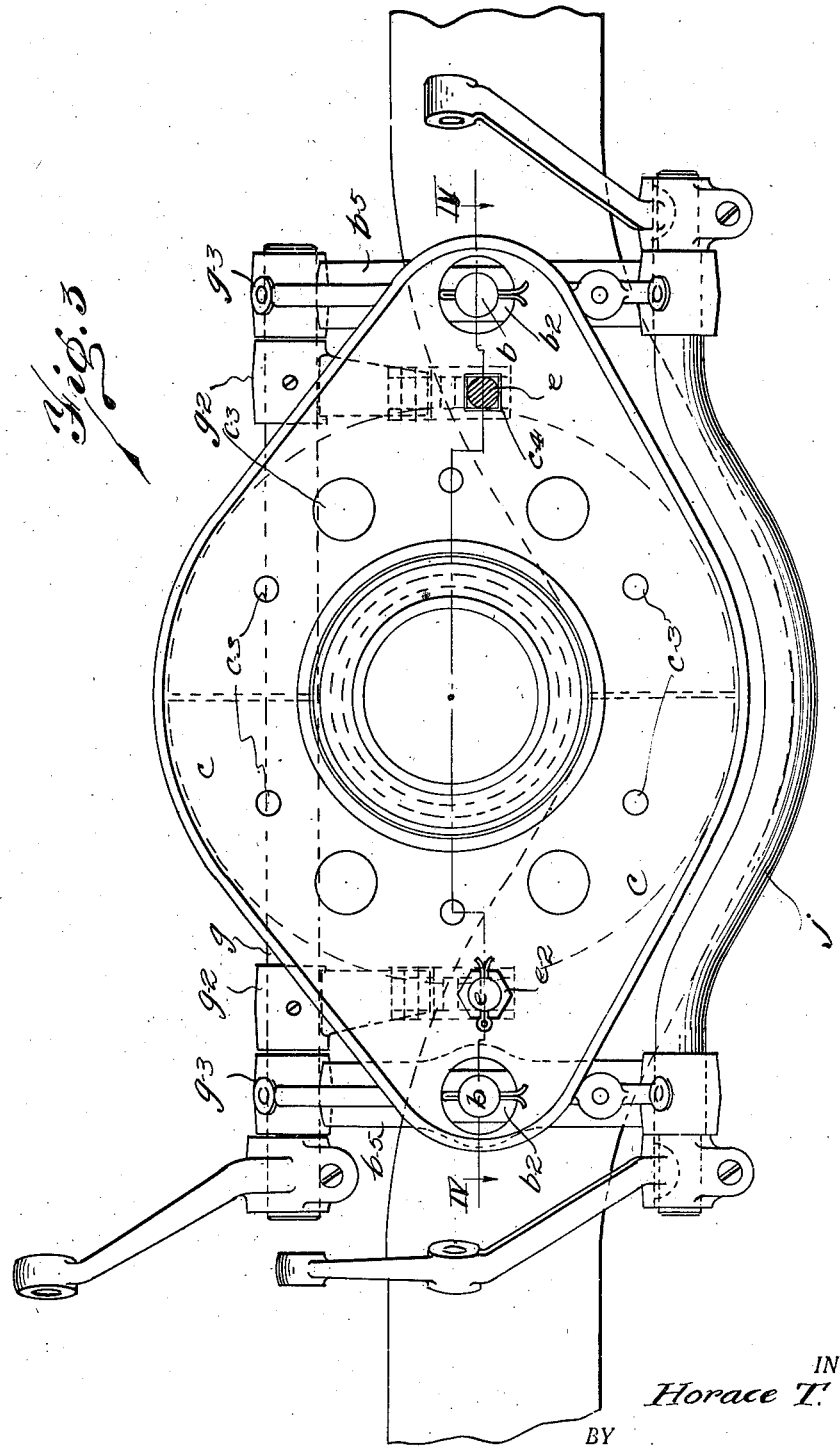

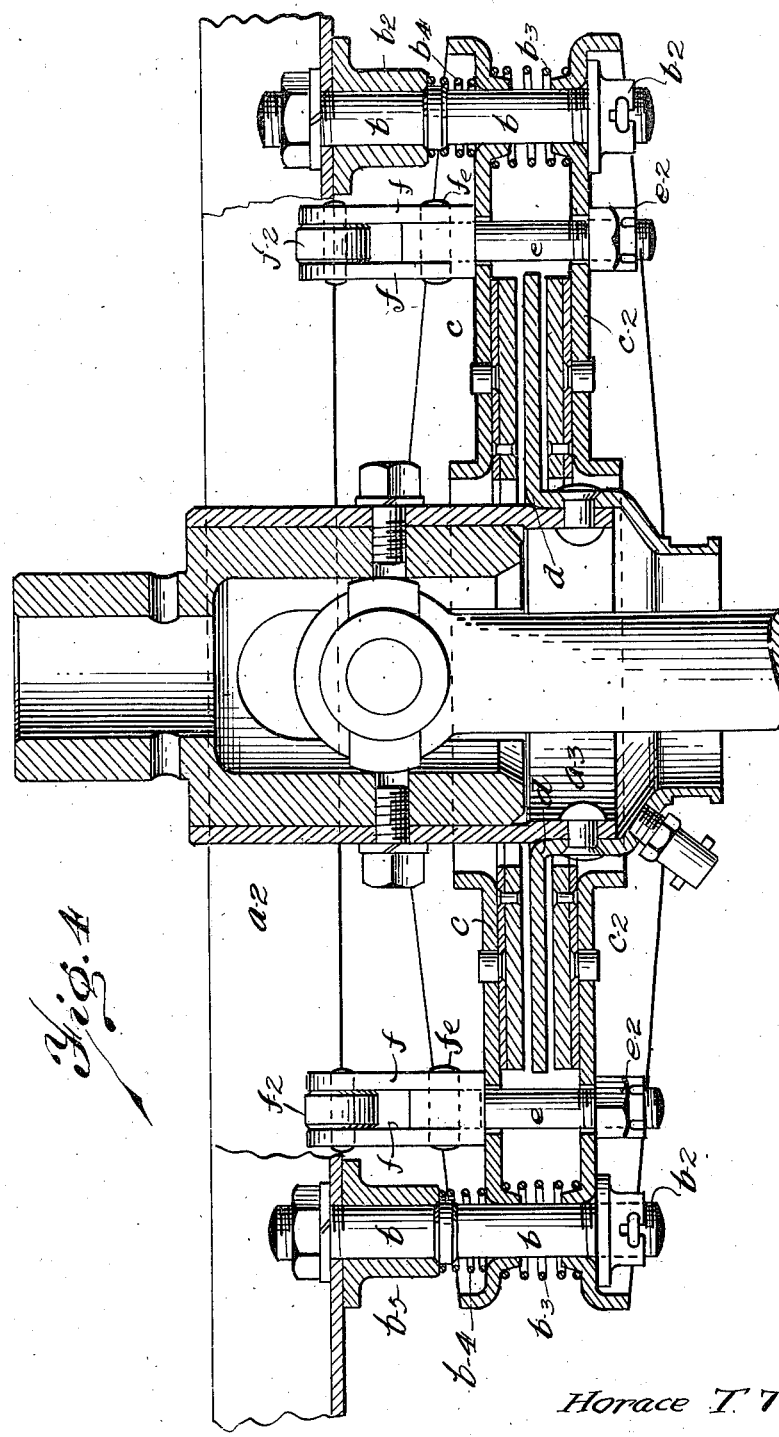

March 29, 1927.
H. T. THOMAS
1,622,475
TRANSMISSION BRAKE
Filed Aug. 6, 1921   6 Sheets-Sheet 5
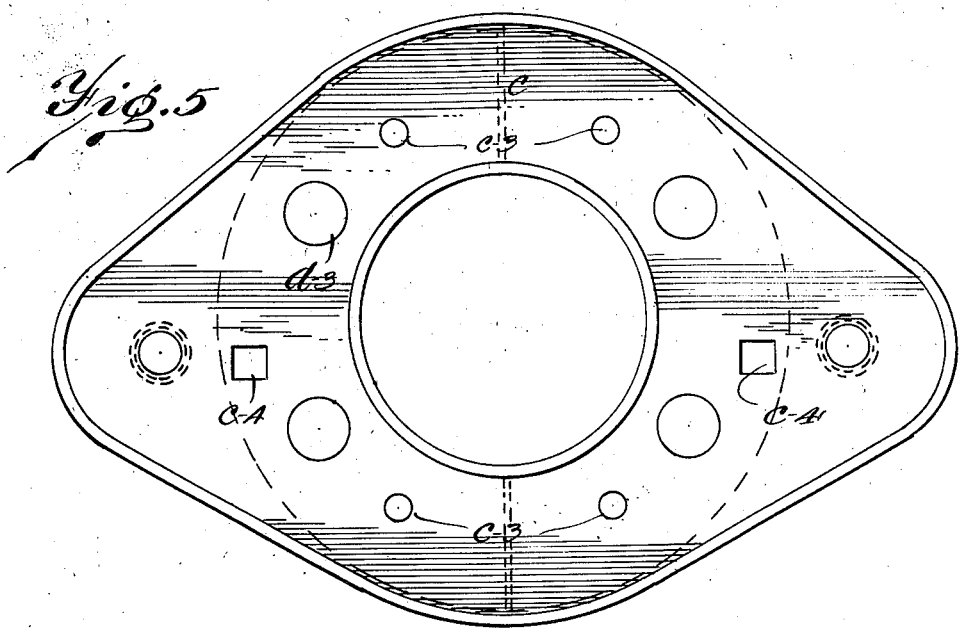
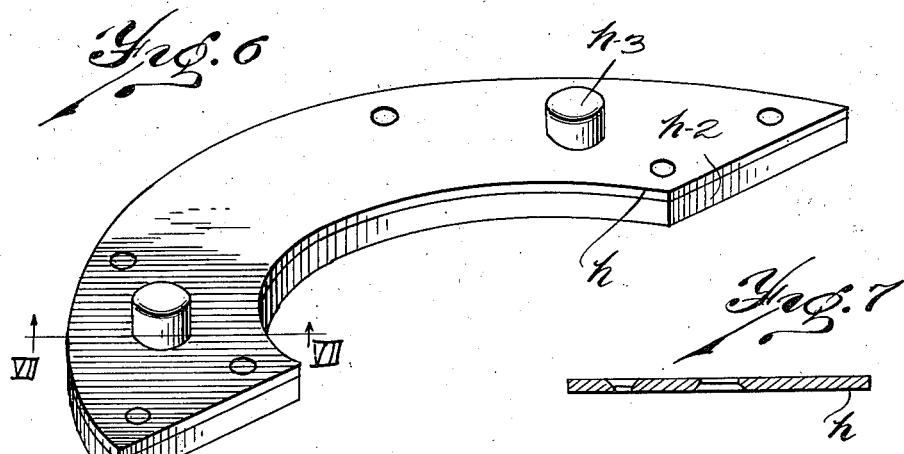
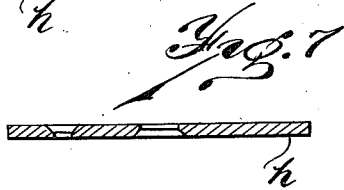
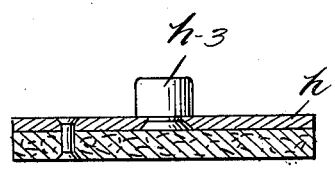
INVENTOR.
Horace T. Thomas
BY Ralzemond A. Parker
ATTORNEY.

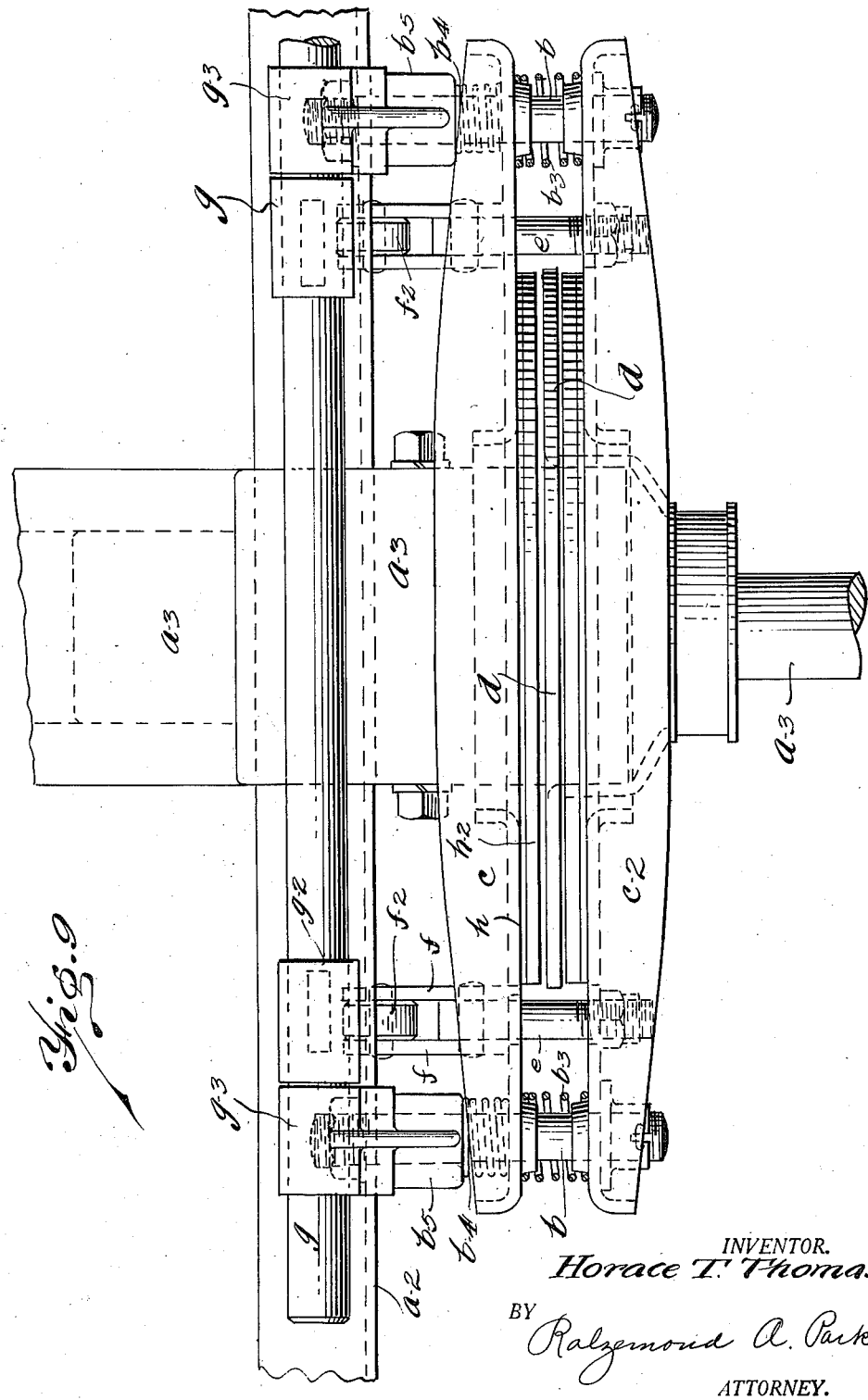

Patented Mar. 29, 1927.

1,622,475

UNITED STATES PATENT OFFICE.

HORACE T. THOMAS, OF LANSING, MICHIGAN.

TRANSMISSION BRAKE.

Application filed August 6, 1921. Serial No. 490,226.

My invention relates to automobiles and an object of my improvements is to provide an improved brake apparatus and one operating directly upon the transmission gearing thereof.

In the accompanying drawings,

Figure 1 is a plan view of an apparatus embodying my invention and the parts of an automobile combined therewith.

Fig. 2 is a side elevation of a brake and immediately adjacent parts partly broken away to more distinctly show the construction.

Fig. 3 is an elevation of the brake and immediately adjacent parts looking from the rear of the machine.

Fig. 4 is a section on the line 4—4 Fig. 3.

Fig. 5 is a face view of one of the clamping plates.

Fig. 6 is a perspective view of one of the adjustable plates with the friction producing sheet thereon.

Fig. 7 is a section on the line 7—7, Fig. 6, the friction material and stud being removed, a rivet hole being shown in the plane of section.

Fig. 8 is a section on the line VII—VII, Fig. 6, one of the rivets securing the friction material in place being shown in the plane of section.

Fig. 9 is a plan view of the brake mechanism and immediately adjacent parts.

$a$ $a$ are side pieces of a chassis of an automobile and $a^2$ is the intermediate cross-piece extending between the side pieces $a$ $a$.

$b$ $b$ are bolts secured to the cross piece $a^2$ and extending horizontally from its rear vertical face. $b^5$ are standards secured by the bolts $b$ $b$ to the cross piece $a^2$ and extending upward and backward over said standards and having bearings $g^3$ $g^3$ in their upper ends.

$c$ and $c^2$ are pressure plates threaded and adapted to reciprocate upon the bolts $b$ as bearings thus securing said plates from rotation while affording a free or floating engagement in reference to reciprocation. $b^3$ $b^3$ are compression springs surrounding the bolts $b$ $b$ and bearing against adjacent faces of the pressure plates $c$ $c^2$. $b^4$ $b^4$ are pressure springs surrounding the bolts $b$ bearing at one end against the standards $e^5$ and at the other end against the adjacent face of the pressure plate $c$.

$a^3$ is the transmission shaft and directly connected parts. $d$ is a friction plate secured to the transmission shaft $a^3$ and in the present instance to the casing of the universal joint forming a part of said shaft and extending between the pressure plates $c$ and $c^2$.

$e$ $e$ are bolts extending through apertures in the pressure plates $c$ $c^2$ inside of the bearing bolts $b$ $b$ and parallel thereto. Said bolts are provided with nuts $e^2$ $e^2$ bearing against the outer surface of the plate $c^2$. $f$ $f$ indicates a cam pivoted to the opposite end of each of the bolts $e$ by means of a pivot pin $f^e$. $f^2$ is a friction roller in the outer end of the cam $f$ $f$. Said cam bears against the outer surface of the plate $c$.

$g$ is a rock shaft extending transversely of the machine above the cross piece $a^2$ and adapted to turn in the bearings $g^3$ $g^3$ in the upper ends of the standards $b^5$ $b^5$. $g^2$ $g^2$ are actuating lever arms keyed upon the shaft $g$ and extending in front of the friction rollers $f^2$ $f^2$.

$j$ is a shaft extending transversely of the machine and bending under the brake parts above described. The shaft $j$ is connected to operate the wheel-brakes of the automobi'e.

$h$ is an adjustable plate having lugs $h^3$ $h^3$ $h^3$ extending from its surface adapted to fit into the apertures $c^3$ in the pressure plate $c$, said pins engaging against the walls of said aperture to form a mechanical clutch acting to prevent relative rotation. The plates $h$ are semicircular, each forming the half of a ring, two of such plates are placed upon the inner surface of each of the pressure plates $c$ $c^2$ forming a complete ring around the transmission shaft and attached parts $a^3$. $h^2$ is a friction producing sheet secured to each of the plates $h$. The friction sheet $h^2$ is upon the outer surface of the plate $h$ when adjusted into position.

The operation of the above described apparatus is as follows:

In the normal position of the parts with the brake free as shown for instance in Fig. 4, the springs $b^3$ have forced the pressure plates $c$ $c^2$ apart so that there is no engagement between said pressure plates or attached parts and the friction plate $d$. When it is desired to apply the brake, the shaft $g$ is turned acting through the lever arms $g^2$ against the friction rollers $f^2$, thus rocking the cams $f$ $f$ about their pivots $f^e$ thus pressing inward upon the pressure plate $c$ and at the same time through the part $e$ and nut $e^2$ drawing upon the pressure plate $c^2$. In this way the plates $c$ $c^2$ are drawn towards each other until the friction material $h^2$ upon the plates $h$ on the inner faces of said pressure plates engage the friction plate $d$ thus applying a brake to the transmission mechanism.

When the friction material $h^2$ becomes worn the operator separates the pressure plates $c$ and $c^2$, removes the plate $h$ and substitutes other plates with suitable friction material on their faces. The springs $b^3$ $b^3$ permit of the separating of the plates $c$ $c^2$ to make their inner faces more accessible.

It will be noted that the plate $h$ may be inserted or removed from position without disassembling the apparatus, that is, these plates are removable within the meaning of this word in this connection.

The rock shaft $j$ extends transversely of the machine below the brake parts above described and under the transmission shaft and attached parts $a^3$.

The above described apparatus constitutes a strong and compact mechanism for operating both brakes and a specially efficient and compact mechanism for applying the brake to the transmission and one in which the friction surfaces may be readily removed as above described.

Claims:

1. In an automobile, the combination of a transmission shaft with a disc fixed thereon against relative rotation, the automobile frame, a disc fixed on said frame against rotation relative thereto, one of said discs being provided with apertures therethrough and a plate having a frictional surface provided with lugs adapted to removably engage in said apertures for the purpose described and means for causing frictional engagement between said plate and the first mentioned disc.

2. In an automobile, the combination of a transmission shaft with a disc fixed thereon against relative rotation, the automobile frame having an intermediate cross piece, a part secured to said cross piece against rotation relative thereto and means for producing a frictional engagement between a side face of said disc and said part, said part being made up of a plurality of parts that are separately removable and replaceable.

3. In an automobile, the combination of a transmission shaft with a disc fixed thereon against relative rotation, the automobile frame, a part fixed on said frame against rotation relative thereto, a plate having a frictional surface thereon, said plate and said part being adapted to have said plate removably fixed upon said part and means for producing a frictional engagement between said part and plate fixed thereon and said disc the parts being so constructed and relatively arranged that said plate may be removed and replaced by unskilled hands and without disassembling, said plate being made up of a plurality of parts that are separately removable and replaceable.

4. In an automobile, the combination of a transmission shaft with a disc thereon fixed against relative rotation, the automobile frame, a pair of discs having a floating engagement with said frame so as to fix them against rotation relative thereto but to permit motion in the direction of the axis of said discs, a friction plate, one of said pairs of discs and said plate being adapted to have the plate removably fixed upon said disc and means for engaging the first mentioned disc between said pair of discs by drawing said disks toward each other.

5. In an automobile, the combination of a transmission shaft with a disc fixed thereon against relative rotation, an automobile frame, a disc having a floating engagement with said frame so as to fix it against rotation relative thereto, but to permit movement in the direction of the axis of said disc, a friction plate, one of said discs being provided with an aperture and said plate being provided with a lug adapted to removably engage in said aperture, and means for frictionally engaging said plate and one of said discs.

6. In an automobile, the combination of a transmission shaft with a disc fixed thereon against relative rotation, an automobile frame having a cross piece, bearing arbors extending horizontally from said cross piece, a second disc sleeved and adapted to reciprocate on said arbors, a rock shaft supported by said cross piece and provided with an actuating arm, the parts being so arranged that the rocking of said shaft shall cause the movement of the disc sleeved thereon into frictional engagement with the disc on said shaft.

7. In an automobile, the combination of a transmission shaft with a disc fixed thereon against relative rotation, an automobile frame having a cross piece, bearing arbors extending horizontally from said cross piece, a pair of discs sleeved and adapted to reciprocate on said arbors severally on opposite sides of the first mentioned disc, a part secured to one of said pairs of discs and extending beyond the other, a cam pivoted on said bolt at its other end and adapted to engage against said other of said discs and means for rocking said cam for the purpose described.

8. In an automobile, the combination of a transmission shaft with a disc fixed thereon against relative rotation, an automobile frame having a cross piece, bearing arbors extending horizontally from said cross piece, a pair of discs sleeved and adapted to reciprocate on said arbors severally on opposite sides of the first mentioned disc, a bolt secured to one of said pairs of discs and extending beyond the other, a cam pivoted on said bolt and adapted to engage against said other of said discs, a rocking shaft pivoted to said cross piece and engaging said cam to rock the same.

9. In an automobile, the combination of a transmission shaft with a disc fixed thereon against relative rotation, an automobile frame having a cross piece, bearing arbors extending horizontally from said cross piece, a pair of discs sleeved and adapted to reciprocate on said arbors severally on opposite sides of the first mentioned disc, a part secured to one of said pairs of discs and extending beyond the other, a cam pivoted on said bolt and adapted to engage against said other and said discs and means for rocking said cam, a spring interposed between said cross piece and the adjacent disc, and a friction plate, one of said discs and said friction plates being constructed to permit of a removable engagement between the same substantially as and for the purpose described.

10. In an automobile, the combination of a transmission shaft with a disc fixed thereon against relative rotation, an automobile frame having a cross piece, a part fixed on said cross piece against rotation relative thereto, a rocking shaft having a bearing supported by said cross piece, means whereby the rocking of said rock shaft shall cause frictional engagement between said part and said disc, a wheel brake apparatus, a second rock shaft supported on said cross piece and means whereby the rocking of said second shaft shall actuate a wheel brake substantially as and for the purpose described.

In testimony whereof, I sign this specification.

HORACE T. THOMAS.